United States Patent
Han

(10) Patent No.: US 9,658,751 B2
(45) Date of Patent: May 23, 2017

(54) MOUSE BUTTON FUNCTION SETTING METHOD AND SYSTEM THEREOF

(71) Applicant: EVGA CORPORATION, New Taipei (TW)

(72) Inventor: Tai-Sheng Han, New Taipei (TW)

(73) Assignee: EVGA Corporation, New Taipei (TW)

( * ) Notice: Subject to any disclaimer, the term of this patent is extended or adjusted under 35 U.S.C. 154(b) by 170 days.

(21) Appl. No.: 14/309,105

(22) Filed: Jun. 19, 2014

(65) Prior Publication Data
US 2015/0205466 A1    Jul. 23, 2015

(30) Foreign Application Priority Data
Jan. 23, 2014    (TW) .............................. 103102544 A

(51) Int. Cl.
| | |
|---|---|
| *G06F 3/048* | (2013.01) |
| *G06F 3/0484* | (2013.01) |
| *G06F 3/0482* | (2013.01) |
| *G06F 3/0354* | (2013.01) |

(52) U.S. Cl.
CPC ........ *G06F 3/0484* (2013.01); *G06F 3/03543* (2013.01); *G06F 3/0482* (2013.01)

(58) Field of Classification Search
CPC .............................. G06F 3/0484; G06F 3/0482
USPC ........................................................ 715/835
See application file for complete search history.

(56) References Cited

U.S. PATENT DOCUMENTS

| | | | | |
|---|---|---|---|---|
| 5,659,693 A | * | 8/1997 | Hansen ................. | G06F 3/0481 715/744 |
| 5,764,222 A | * | 6/1998 | Shieh .................... | G06F 3/0488 345/157 |
| 5,835,079 A | * | 11/1998 | Shieh .................... | G06F 3/0488 345/156 |
| 5,872,559 A | * | 2/1999 | Shieh .................... | G06F 3/0488 178/18.01 |
| 5,874,948 A | * | 2/1999 | Shieh .................... | G06F 3/0488 345/157 |
| 6,018,335 A | * | 1/2000 | Onley .................... | G06F 3/023 341/22 |
| 6,067,079 A | * | 5/2000 | Shieh .................... | G06F 3/0488 345/156 |
| 6,125,385 A | * | 9/2000 | Wies ....................... | G06F 3/016 345/163 |
| 6,992,656 B2 | * | 1/2006 | Hughes .................. | G06F 3/038 345/163 |
| 7,424,306 B2 | * | 9/2008 | Eichenbaum .......... | G06F 1/165 345/168 |

(Continued)

FOREIGN PATENT DOCUMENTS

TW    103102544    5/2015

*Primary Examiner* — David Phantana Angkool
(74) *Attorney, Agent, or Firm* — Wang Law Firm, Inc.

(57) ABSTRACT

A mouse button function setting method and a system thereof are applied to a mouse having multiple buttons. The method comprises following steps. A short cut function planning interface, which displays a function list and a short cut list, is provided. One of short cuts is selected form the short cut list. At least one of functions is selected from the function list and set to the selected short cut. A button setting interface, which displays the short cut list and multiple button icons, is provided. Multiple button icons correspond to multiple buttons respectively. One of short cuts is set to one of multiple button icons.

8 Claims, 4 Drawing Sheets

(56) References Cited

U.S. PATENT DOCUMENTS

| | | | |
|---|---|---|---|
| 7,562,007 B2 * | 7/2009 | Hwang | G06F 17/275 704/3 |
| 7,710,397 B2 * | 5/2010 | Krah | G06F 3/03543 345/163 |
| 8,711,095 B2 * | 4/2014 | Tan | G06F 3/03543 345/163 |
| 2015/0205466 A1 * | 7/2015 | Han | G06F 3/0484 715/835 |

* cited by examiner

MOUSE BUTTON FUNCTION SETTING METHOD AND SYSTEM THEREOF

CROSS-REFERENCE TO RELATED APPLICATION

This application claims the benefit of Taiwan Patent Application No. 103102544, filed on Jan. 23, 2014, in the Taiwan Intellectual Property Office, the disclosure of which is incorporated herein in its entirety by reference.

BACKGROUND OF THE INVENTION

1. Field of the Invention

The present disclosure is related to a mouse button function setting method, particularly, to a method capable of assigning multiple functions to mouse buttons more conveniently.

2. Description of the Related Art

As software interface for computer is developing to more human-centered design, the operation for computer has relied on usage of mouse completely. Generally, the mouse is used to control a cursor shown on the displayer or to trigger an application program. Every time user moves the mouse or presses button on the mouse, the computer receives packet transmitted from the mouse immediately. Content of the packet contains data related to movement of the mouse or pressed button, so the computer can obtain movement data of the mouse by parsing the packet and then display the cursor on a new position correspondingly, or obtain data of the pressed button to execute corresponding instruction.

In order to improve convenience of gaming operation, a common gaming mouse has left button, right button, roller and many additional buttons are provided, such as several left lateral buttons and right lateral buttons. The buttons of the mouse can be set to different shortcut functions upon user's demand.

However, as amount of buttons increases and assignable shortcut functions become more and more, the button setting interface becomes complex and the user must spend more time to set shortcut functions of buttons of mouse. Therefore, what is need is to simplify setting of shortcut function for the mouse having multiple buttons.

SUMMARY OF THE INVENTION

Therefore, it is a primary objective of the present disclosure to provide a mouse button function setting method and system thereof, so as to simplify setting flow and keep flexibility of advanced setting for user.

In view of above problems, another objective of the present disclosure is to provide a mouse button function setting method and system thereof, so as to make function setting more straightforward and being more easily judged.

In view of above problems, another objective of the present disclosure is to provide a mouse button function setting method and system thereof, a mistake-proofing scheme is implemented in the method and system to prevent left-click function from not being assigned mistakenly.

In view of above problems, another objective of the present disclosure is provide a mouse button function setting method and system thereof, so that user can assign one function to a plurality of buttons more easily.

According to above objectives, the present disclosure provide a mouse button function setting method applied to a mouse having a plurality of buttons. The mouse button function setting method comprise following steps. A shortcut function planning interface, which displays a function list and a shortcut list, is provided. One of shortcuts is selected form the shortcut list. At least one of functions is selected from the function list and set to the selected shortcut. A button setting interface, which displays the shortcut list and multiple button icons, is provided. Multiple button icons correspond to multiple buttons respectively. One of shortcuts is set to one of multiple button icons.

Preferably, the shortcuts are indicated by different numbers.

Preferably, the shortcuts contained in the shortcut list are displayed in different colors, in the button setting interface.

Preferably, the button setting interface further comprises a mouse pattern, and a plurality of button icons are placed in the positions corresponding to the plurality of buttons in the mouse pattern, respectively.

Preferably, the shortcut function planning interface may comprise a shortcut function corresponding list to display the corresponding function for each shortcut.

Preferably, mouse button function setting method in accordance with the present disclosure may further comprise a step of assigning a left-click function to one button not assigned function yet when none of the plurality of buttons is assigned to the left-click function.

According to above objective, the present disclosure further provides a mouse button function setting system applied to a mouse having a plurality of buttons. The mouse button function setting system comprises a shortcut function planning interface, a button setting interface, a communication interface and a selection unit. The shortcut function planning interface comprises a function list and a shortcut list which displays a plurality of shortcuts. The button setting interface comprises the shortcut list and a plurality of button icons which correspond to the plurality of buttons of the mouse, respectively. The button setting interface comprises the shortcut list and a plurality of button icons which correspond to the plurality of buttons of the mouse, respectively.

Preferably, the shortcuts are indicated by different numbers.

Preferably, the shortcuts in the shortcut list are displayed in different colors, in the button setting interface.

Preferably, the button setting interface further comprises a mouse pattern, and a plurality of button icons are placed in the positions corresponding to the plurality of buttons in the mouse pattern, respectively.

Preferably, the shortcut function planning interface may comprise a shortcut function corresponding list to display the corresponding function for each shortcut.

Preferably, mouse button function setting system in accordance with the present disclosure may further comprise a mistake-proofing unit. When the mistake-proofing unit judges that none of the plurality of buttons is assigned as a left-click function, the mistake-proofing unit will assign the left-click function to one button not being assigned function yet.

BRIEF DESCRIPTION OF THE DRAWINGS

The detailed structure, operating principle and effects of the present disclosure will now be described in more details hereinafter with reference to the accompanying drawings that show various embodiments of the invention as follows.

DETAILED DESCRIPTION OF THE PREFERRED EMBODIMENTS

The technical content of the present disclosure will become apparent by the detailed description of the following embodiments and the illustration of related drawings as follows. It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 1:
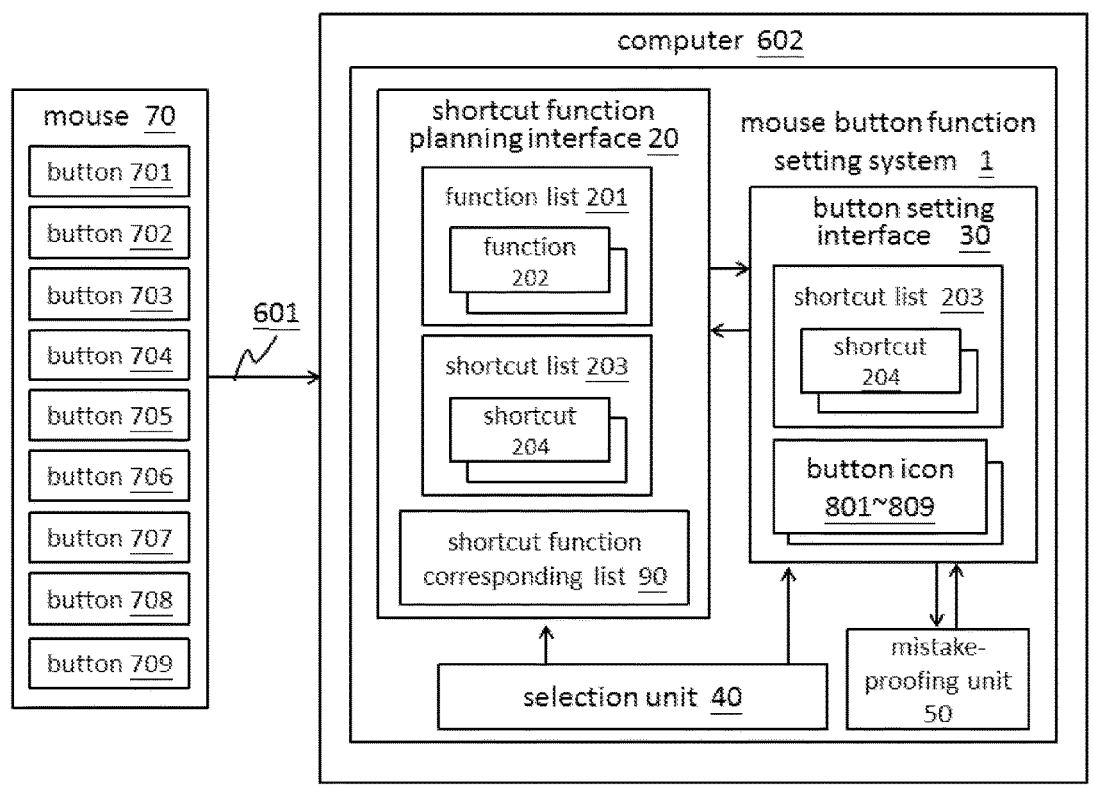
FIG. 1 is a block view of a mouse button function setting system in accordance with the present disclosure.
Figure 2:
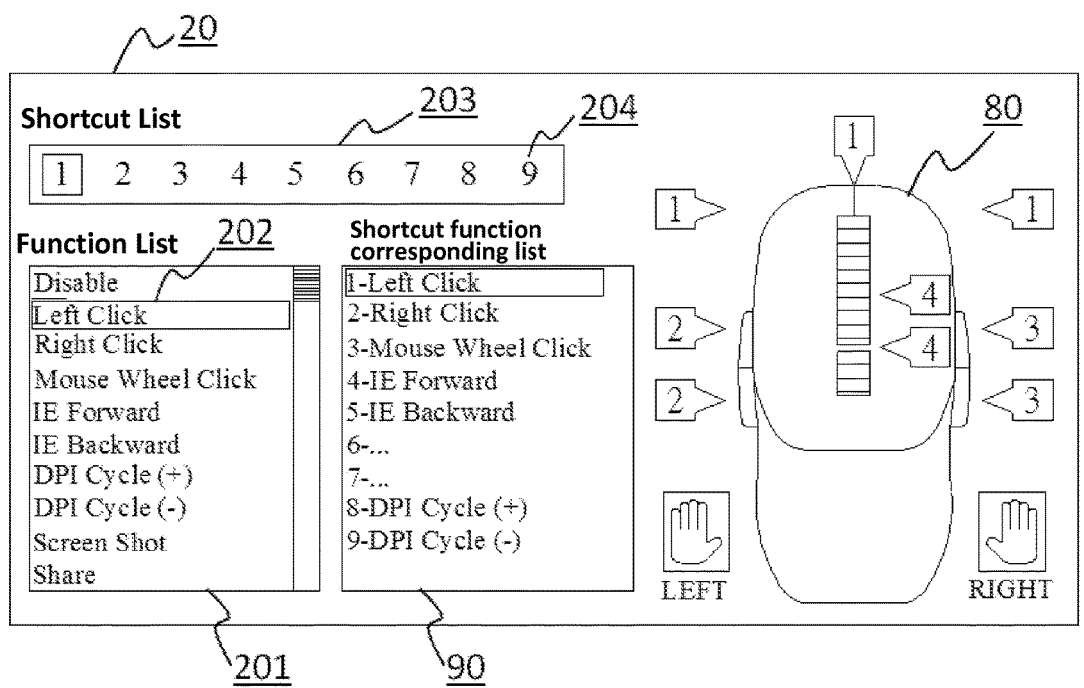
FIG. 2 is a schematic view of embodiment of the shortcut function planning interface in accordance with the present disclosure.
Figure 3:
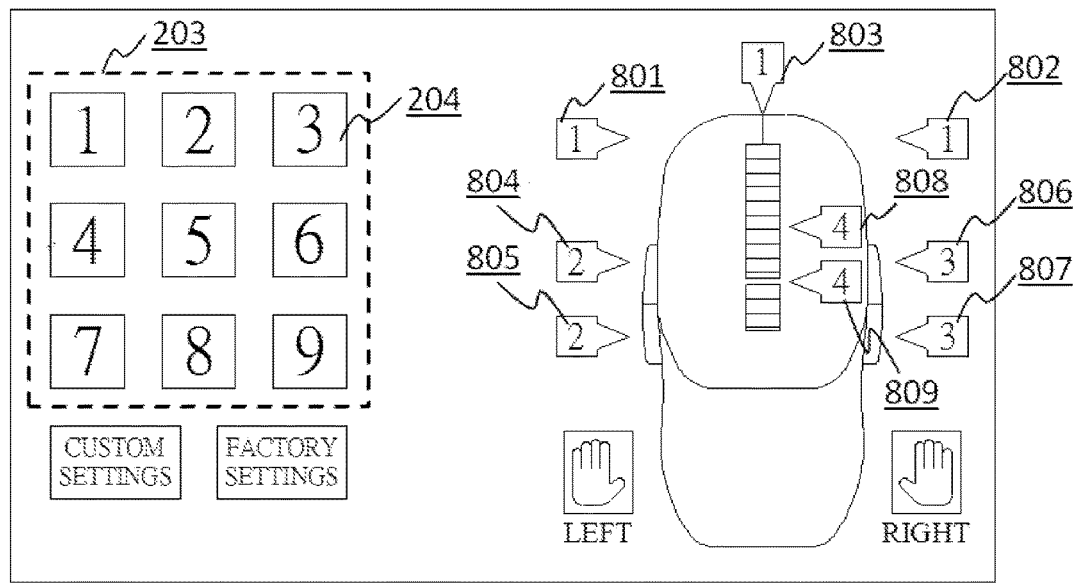
FIG. 3 is a schematic view of embodiment of a button setting interface of the present disclosure.

Please refer to FIG. 1 to FIG. 3 which are block view of a mouse button function setting system, schematic view of embodiment of shortcut function planning interface, and schematic view of embodiment of button setting interface in accordance with the present disclosure, respectively. In FIG. 1, a mouse button function setting system 1 is applied to a mouse 70 having a plurality of buttons 701~709. The button 701 may be a left button, the button 702 may be a right button, the button 703 may be a roller button, the button 704 may be a first left lateral button, and the button 705 may be a second left lateral button, and so on. The mouse button function setting system 1 comprises a shortcut function planning interface 20, a button setting interface 30, a selection unit 40 and a mistake-proofing unit 50. The mouse button function setting system 1 is executed in computer 602, and the mouse 70 is connected with the computer 602 via a communication interface 601, such as a PS/2 interface, a USB interface, or a wireless transmission interface.

The shortcut function planning interface 20 comprises a function list 201 which contains a plurality of functions, and a shortcut list 203 which contains a plurality of shortcuts 204. The plurality of shortcut 204 can be indicated by different numbers, letters, symbols or colors. Besides, the shortcut function planning interface 20 further comprises a shortcut function corresponding list 90 to display corresponding function 202 for every shortcut 204, so that user can understand the corresponding relationship between the shortcuts 204 and functions 202 more easily.

Figure 4:
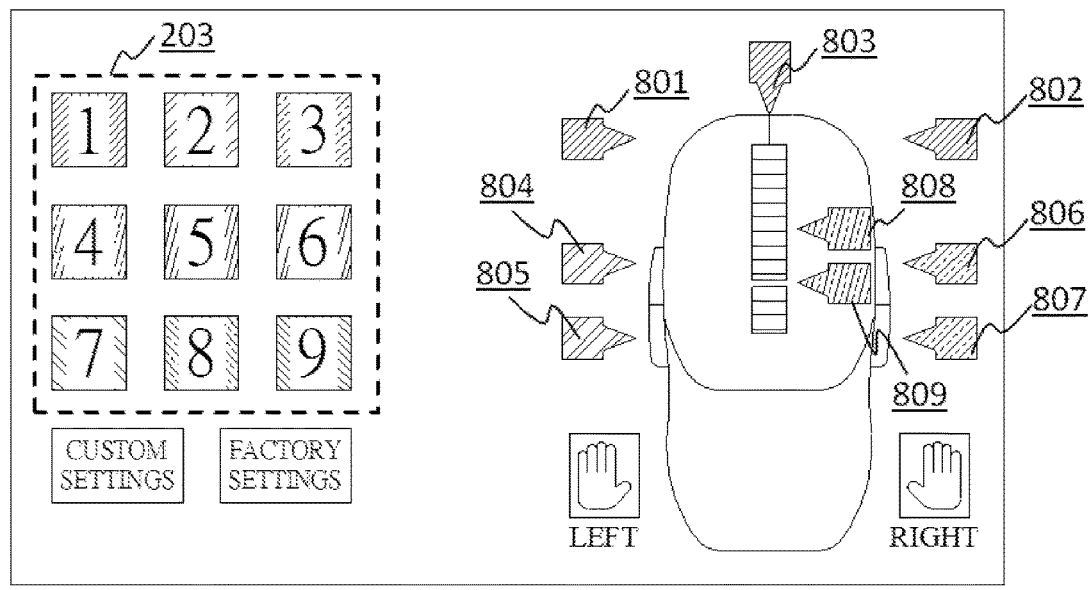
FIG. 4 is a schematic view of another embodiment of the button setting interface of the present disclosure.

The button setting interface 30 comprises a shortcut list 203 and a plurality of button icons 801~809. The button icons 801~809 correspond to a plurality of buttons 701~709 of mouse 70, respectively. The shortcut list 203 on the button setting interface 30 and the shortcut list 203 on the shortcut function planning interface 20 may have the same content but be displayed in different manners upon demand. However, it does not affect the characteristic that the shortcut list 203 displays a plurality of shortcuts 204. In implementation, the plurality of shortcuts 204 within the shortcut list 203 can be displayed in different colors on the button setting interface 30, as shown in FIG. 4.

Moreover, the shortcut function planning interface 20 or the button setting interface 30 further comprises a mouse pattern 80 if necessary, as shown in FIG. 2 and FIG. 3. The plurality of button icons 801~809 are placed on positions corresponding to the plurality of buttons 701~709 in the mouse pattern 80, so that user can understand the corresponding relationship between button icons 801~809 and buttons 701~709 more straightforward.

User may operate the shortcut function planning interface 20 and the button setting interface 30 via the selection unit 40. The selection unit 40 may comprise keyboard, Joystick, touch pad, or mouse 70.

The mouse has more and more operational functions, even more than forty functions, so it is undoubted that user must spend a lot of time to assign function to each button of mouse one by one. The advantage of the mouse button function setting system 1 is that user can plan the desired shortcuts 204 on the shortcut function planning interface 20 in advance without assigning for function of each of buttons 701~709, and user can assign different shortcut 204 to each button 701~709 later. In the operation, user can select at least one function 202 from the function list 201 on the shortcut function planning interface 20 via selection unit 40, and then assign at least one function 202 to the selected shortcut 204.

For example, in FIG. 2 the shortcut list 203 comprises nine shortcuts 204 for user's setting. The nine shortcuts 204 are indicated in number, but it is not limited to. The shortcuts 204 can also be expressed in different letters, symbols or colors. The function list 201 comprises a lot of functions 202 for user to select, such as functions of left click, right click, mouse wheel click, web page forward, web page backward, screen zoom in, screen zoom out, screen shot, or share. The function list 201 can be expressed by one-level list table or multi-level list table. Firstly, user can select a first shortcut 204 via selection unit 40 and then select the function of left click, so that the function of left click is assigned to the first shortcut 204.

According to the shortcut function corresponding list 90, user may check corresponding functions for each of shortcuts 204. For example, as shown in FIG. 2, the first shortcut 204 is assigned as the function of left click, and the second shortcut 204 is assigned as the function of right click, and the third shortcut 204 is assigned as the function of mouse wheel click. The sixth shortcut and the seventh shortcut 204 are not assigned to any function.

The mouse pattern 80 can also be display on the shortcut function planning interface 20, so that user can understand a current function setting condition for whole buttons.

In FIG. 3, user assigns one of the plurality of shortcuts 204 to one of the plurality of button icons 801~809 on the button setting interface 30. It is noted that the shortcut list 203 of the button setting interface 30 and the shortcut list 203 of the shortcut function planning interface 20 are shown in different looks, but it does not affect the feature that the shortcut list 203 displays a plurality of shortcuts 204 to allow user to select.

For example, button icon 801 of the left button 701, button icon 802 of the right button 702 and the button icon 803 of the roller button 703 shown in FIG. 3 are assigned to the function corresponding to the first shortcut, and button icon 804 and 805 of two left lateral buttons shown in FIG. 3 are assigned to the function corresponding to the second shortcut.

According to the above mentioned, when desiring simple button functions for mouse 70 and multiple buttons are assigned to the same function, the user can assign the shortcut to multiple button icons directly on button setting interface 30. However, in the prior art, user must select a function from the function list and then assign the selected function to a button repeatedly, therefore, if there are multiple buttons, user must repeat the action several times. Compared with the prior art, mouse button function setting system 1 in accordance with the present disclosure has more convenience.

The mouse button function setting system 1 further comprises a mistake-proofing unit 50 which can judge whether none of the plurality of buttons 701~709 is assigned to the left-click function; if yes, the mistake-proofing unit 50 will assign the left-click function to one button of buttons 701~709, which is not being assigned function yet. The left click of mouse is basic operation for current windows operation system, if user forgets to set function of left click, it may result in that mouse cannot be used in operation system.

Therefore, the mistake-proofing unit 50 is to ensure that at least one button of the mouse 70 is set to function of left button, to prevent from failure of using operation system due to user's mistake.

After user complete the setting, the mouse button function setting system 1 saves the setting result in the mouse driver installed in the computer 602. When receiving button data from the mouse via the communication interface 601 and judge which button is pressed by user based on the button data, the mouse driver generates a function instruction corresponding to the pressed button based on the setting result, and the computer 602 executes this function instruction.

Please refer to FIG. 4 which is a schematic view of another embodiment of the button setting interface of the present disclosure. This embodiment is similar to the above embodiment, but the difference between this embodiment and the above embodiment is that a plurality of shortcuts 204 are indicated by various colors and shortcuts 204 corresponding to a plurality of button icons 801~809 are also indicated by color.

Figure 5:
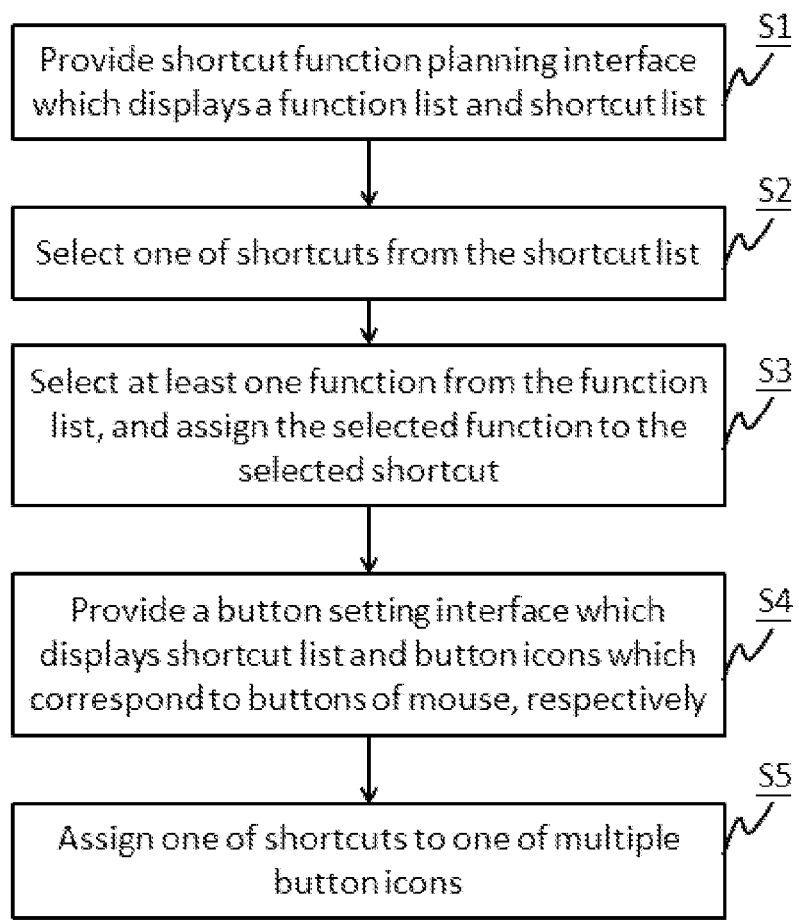
FIG. 5 is a flow of a mouse button function setting method in accordance with the present disclosure.

Please refer to FIG. 5 which is a flow of a mouse button function setting method in accordance with the present disclosure. The mouse button function setting method is illustrated according to the mouse button function setting system 1 shown in FIG. 1. The mouse button function setting method comprises following steps. In step S1, a shortcut function planning interface 20 which displays a function list 201 and a shortcut list 203, is provided. The shortcut list 203 comprise a plurality of shortcuts that can be indicated by different numbers, letters, symbols or colors. The function list 201 may comprise a lot of functions for user 202 to select, such as functions of left click, right click, mouse wheel click, web page forward, web page backward, screen zoom in, screen zoom out, screen shot, or share.

In step S2, one of shortcuts 204 is selected from the shortcut list 203. In step S3, at least one function 202 is selected from the function list 201, and the selected function 202 is assigned to the selected shortcut 204.

In step S4, the button setting interface 30 is provided. The button setting interface 30 displays a shortcut list 203 and a plurality of button icons 801~809. The button icons 801~809 correspond to a plurality of buttons 701~709 of mouse 70, respectively.

In step S5, One of shortcuts 204 is assigned to one of multiple button icons 801~809. In operation, the assign can be implemented by mouse drag-drop, arrow keys on keyboard or touch control.

It is noted that the shortcut function planning interface 20 and the button setting interface 30 are displayed by different type in the illustration of embodiment, but it is not limited to. The shortcut function planning interface 20 and the button setting interface 30 can also be displayed in one screen based on demand, so these interfaces which can allow user to assign function to shortcut and assign the shortcut to button respectively, are included within the spirit and scope of the appended claims.

The present disclosure has been described via the detailed illustration of the preferred embodiment. Those skilled in the art can derive variations from the preferred embodiment without departing from the scope of the present disclosure. Therefore, the preferred embodiment shall not limit the scope of the present disclosure defined in the claims.

What is claimed is:

1. A mouse button function setting method, adapted for a mouse having a plurality of buttons, the mouse button function setting method comprising steps of:
    providing a shortcut function planning interface which displays a function list, a shortcut list, and a shortcut function corresponding list simultaneously;
    selecting one of a plurality of shortcuts from the shortcut list;
    selecting at least one function from the function list and assigning the selected function to the selected shortcut;
    providing a button setting interface which displays the shortcut list and multiple button icons, and the multiple button icons corresponding to the multiple buttons of the mouse respectively; and
    assigning one of the shortcuts to one of the multiple button icons,
    wherein the shortcut function planning interface comprises a shortcut function corresponding list which displays corresponding functions for each of the shortcuts, wherein the shortcut function corresponding list displays the corresponding function for each of the shortcuts, and
    wherein when desiring simple button functions for the mouse and the plurality of buttons are assigned to the same function, the plurality of shortcuts are provided for a user to directly assigning to the multiple button icons on the button setting interface.

2. The mouse button function setting method according to claim 1, wherein the plurality of shortcuts are indicated by different numbers, letters, symbols or colors, and the plurality of shortcuts in the shortcut list are displayed by different colors in the button setting interface.

3. The mouse button function setting method according to claim 1, wherein the button setting interface further comprises a mouse pattern, and the plurality of button icons are placed in the positions corresponding to the plurality of buttons in the mouse pattern, respectively.

4. The mouse button function setting method according to claim 1, further comprising a step of assigning a left-click function to one button not assigned function yet when none of the plurality of buttons is assigned to the left-click function.

5. A mouse button function setting system, adapted for a mouse having multiple buttons, the mouse button function setting system comprising:
    a shortcut function planning interface, configured to display a function list, a shortcut list including a plurality of shortcuts, and a shortcut function corresponding list simultaneously;

a button setting interface, comprising the shortcut list and a plurality of button icons which correspond to the multiple buttons of the mouse, respectively; and a selection unit, allowing a user to select at least one function from the function list and select a shortcut from the shortcut list on the shortcut function planning interface, and assign the selected function to the selected shortcut, and allowing user to assign one of the plurality of shortcuts to one of the plurality of button icons on the button setting interface, wherein the shortcut function planning interface comprises a shortcut function corresponding list which displays corresponding functions for each of the shortcuts, wherein the shortcut function corresponding list displays the corresponding function for each of the shortcuts, and wherein when desiring simple button functions for the mouse and the plurality of buttons are assigned to the same function, the plurality of shortcuts are provided for a user to directly assigning to the multiple button icons on the button setting interface.

6. The mouse button function setting system according to claim 5, wherein the plurality of shortcuts are displayed in the different colors, in the button setting interface, and the plurality of shortcuts in the shortcut list are displays by different colors in the button setting interface.

7. The mouse button function setting system according to claim 5, wherein the button setting interface further comprises a mouse pattern, and the plurality of button icons are placed in the positions corresponding to the plurality of buttons in the mouse pattern, respectively.

8. The mouse button function setting system according to claim 5, further comprising a mistake-proofing unit, the mistake-proofing unit assigns a left-click function to one button not assigned function yet when the mistake-proofing unit judges that none of multiple buttons is assigned to the left-click function.

* * * * *